H. W. HOBBS.
HORIZONTAL ARC LAMP.
APPLICATION FILED FEB. 24, 1910.
1,132,776. Patented Mar. 23, 1915.
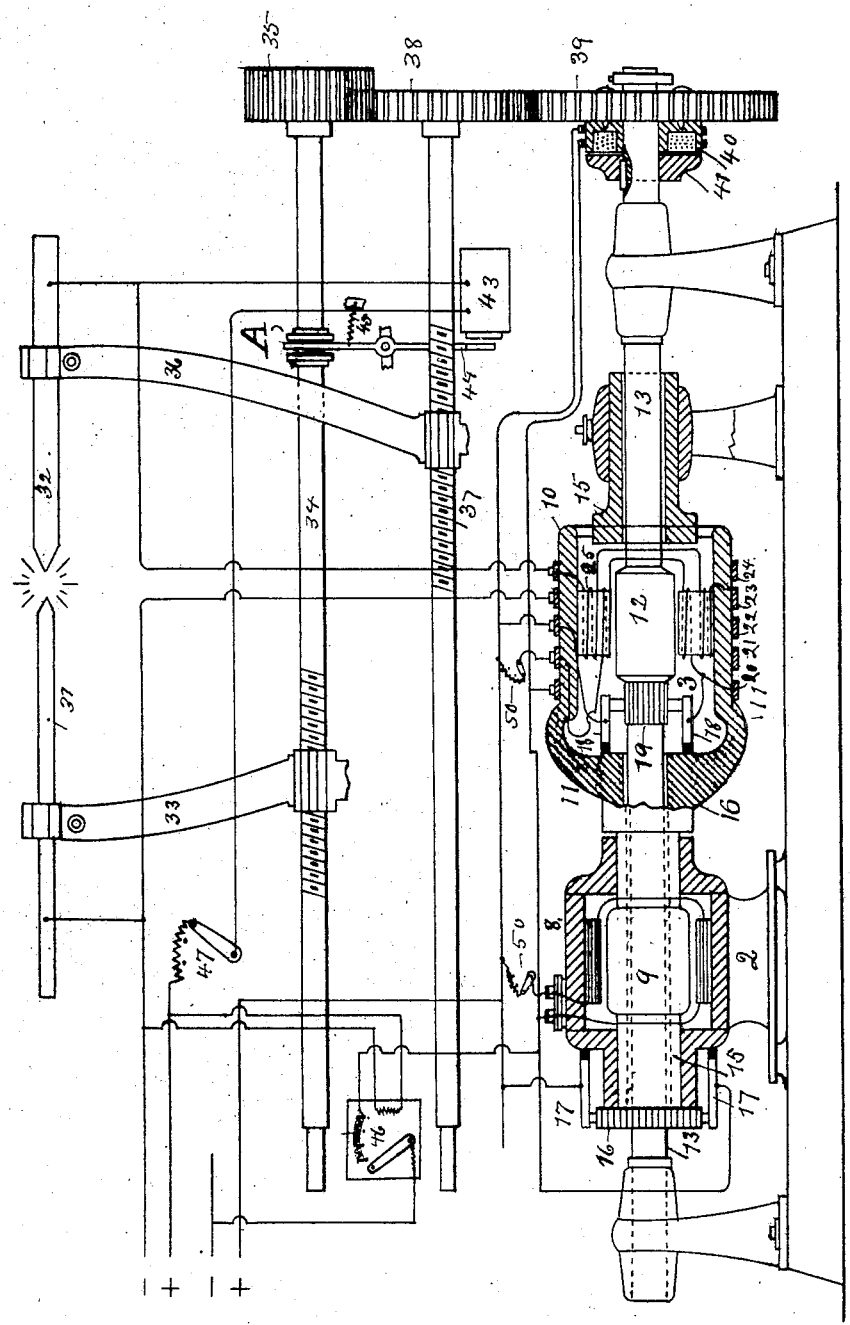
WITNESSES—
Charles L. Foster
Mary C. Page
INVENTOR—
Henry W. Hobbs.
by Clifford Verrill Clifford
Attorneys

UNITED STATES PATENT OFFICE.

HENRY W. HOBBS, OF PORTLAND, MAINE.

HORIZONTAL ARC-LAMP.

1,132,776.  Specification of Letters Patent.  Patented Mar. 23, 1915.

Application filed February 24, 1910. Serial No. 545,626.

*To all whom it may concern:*

Be it known that I, HENRY W. HOBBS, a citizen of the United States, residing at Portland, in the county of Cumberland and State of Maine, have invented certain new and useful Improvements in Horizontal Arc-Lamps, of which the following is a specification.

This invention relates to means for automatically regulating the carbons of electric arc lights, particularly search lights, and in a general way the invention comprises an arc circuit having two carbons therein and means for adjusting them, a motor circuit, two electric motors in circuit therewith, one having a stationary field magnet and the other a rotary field magnet, the former having a rotary armature fixed to the field magnet of the latter and the latter having a freely rotary armature, or any equivalent arrangement of the magnets and armatures, suitable electric connections for permitting the current to rotate the armature of the first motor and to cause the armature of the second motor to remain stationary as long as the voltage across the arc remains constant and to rotate in either direction for the purpose of regulating according as the voltage varies, means for automatically and quickly separating the carbons, means for preventing jamming of the arc regulating mechanism, and means for automatically opening the motor circuit when the arc circuit is opened.

The figure is a representation of one embodiment of my invention, partly in elevation, partly in vertical section and partly in diagram.

Any suitable type of direct current electric motor may be employed and only so much thereof is shown as is necessary to illustrate the invention.

In the drawing 2 and 3 are electric motors. Motor 2 comprises a stationary field magnet 8 and a revoluble armature 9 permanently attached to one of the elements of motor 3 in any convenient manner, as shown by connecting spokes or ribs 11. Motor 3 comprises a field magnet 10 and an armature 12, both rotary. The armature 12 of motor 3 is mounted upon a shaft 13 which passes through a hollow bearing 15, to which the rotary field frame of motor 3 is attached, as is also armature 9 of motor 2, whereby armature 12 of motor 3 may be rotated independently of armature 9 of motor 2. The armature 9 of motor 2 is provided with a commutator 16 having stationary brushes 17. The armature 12 of motor 3 is provided with a commutator 19 having brushes 18 secured to the bearing 15. Commutator 16 is designed to commutate the current for armature 9 and commutator 19 is designed to commutate the current for armature 12. Motor 2 is a shunt motor, and motor 3 is a similar motor with the addition of an extra set of field magnet coils connected in shunt with the arc circuit. A series of collector rings 20, 21, 22, 23 and 24 carried by field magnet 10 serves for currents passing through motor 3. Shaft 13 is provided with a gear 39 in mesh with a gear 38 on a threaded shaft 37 on which is mounted the carbon supporting arm 36 which arm supports the positive carbon 32 of the lamp. Gear 38 in turn meshes with a gear 35 on a threaded shaft 34, on which is mounted the carbon supporting arm 33 which supports the negative carbon 31 of the lamp. Connected with the motor circuit is a magnetic clutch 40, one element of which is rigidly secured to gear 39, said gear 39 being normally loose on its shaft. When the motor circuit is closed, the clutch coil becomes energized and attracts its armature 41 splined on shaft 13, locking gear 39 to shaft 13 which then rotates with armature 12, which is then rotatable in either direction, according as the voltage across the arc varies, and thereby causing the carbons to approach or recede according to the direction in which the armature 12 rotates.

In practical operation the carbons are first brought into touch momentarily to draw the arc and then are separated a definite distance and maintained at a constant distance apart. This can be effected automatically by the gears and electrical and mechanical connections heretofore described. With these, however, there is an appreciable time required to effect a separation of the carbons and to expedite this I introduce into the arc circuit an electromagnet 43. A pivoted lever 44 has one end secured to the armature of magnet 43 which armature is held normally separated from the magnet by means of a spring 45. The other end of lever 44 is connected to a collar A set on shaft 34, shaft 34 being loosely and slidably mounted in bearings, not shown, whereby, when the magnet is energized, which happens when the carbons approach so as to complete the arc circuit, the magnet draws the armature end of the lever to itself, thus imparting a sudden endwise thrust to shaft 34 and causing thereby an immediate limited separation of the carbons. In the motor circuit is a starting box 34, the solenoid of which is energized from the arc circuit, so that, when the arc circuit is open, the solenoid is deënergized, thus releasing the contact arm of the starting box, opening the motor circuit and stopping further movement of the arc regulating mechanism, thus preventing what may be termed jamming of the carbons. An adjustable resistance 50 is placed in one or both of the shunt field circuits of the motors by means of which the apparatus can be so set that it will maintain any desired voltage across the arc.

The arc circuit includes the rheostat, the striking magnet and the positive and negative carbons and in shunt the auxiliary field of motor 3. The motor circuit includes motors 2 and 3 and the magnetic clutch which are connected in multiple through the automatic starting box.

Assuming a 60-inch searchlight requiring two hundred amperes at 65 volts across the arc to be supplied with current from a 125 volt direct current plant some distance away, the motors of the lamp mechanism being wound for 110 volts. To avoid the use of heavy copper wire separate feeders are led from the plant to the arc circuit and to the motor circuit. The size of wire for the arc circuit is then affected by two factors, viz., safe carrying capacity and a terminal voltage of 65 volts at the arc. The final adjustment of fixed voltage is made by means of the rheostat 47. By means of resistances 50, the fields of motors 2 and 3 are so adjusted that when the motor and arc circuits are both energized and the voltage across the arc, which is also impressed on the auxiliary field 25 of motor 3, is 65 volts, the armature 12 is at rest.

A complete cycle of operation of my device under the assumed condition follows, starting with the carbons separated. The current in the arc circuit is flowing from the positive wire through the rheostat 47, the striking magnet 43 and the auxiliary field 25 of motor 3 to the negative wire but not through the carbons. The motors are started to draw the arc by moving the arm of the starting box 46 to the extreme right where it is held by the solenoid which is energized by the current flowing in the arc circuit. The current in the motor circuit is flowing from the positive wire through the armatures and shunt fields of motors 2 and 3 and through the clutch coil 40, all of which are connected in multiple, and thence to the negative wire through the starting box. The carbons being separated only a small current is flowing through the rheostat and practically full voltage is impressed on the auxiliary field 25, making the field of motor 3 stronger than normal and producing a resultant rotation of armature 12 in a direction to cause the carbons to feed together. The clutch coil 40, being energized, attracts its disk armature 41 and locks the gear 39 to the shaft of armature 12 so that the gear train is actuated by the movement of the armature and the carbons are brought together. As soon as the carbons touch current flows from the positive wire through the rheostat, striking magnet and carbons to the negative wire. This current causes the striking magnet to attract its armature, and the resultant movement of the lever 44 imparts an endwise thrust to the shaft 34, giving an immediate measured separation to the carbons and drawing an arc. While the carbons are in contact, the voltage at the terminals of the auxiliary field coil 25 is 0, and the field of motor 3 is made weaker than normal, causing the armature 12 to reverse automatically and rotate in the opposite direction to its field and tending to separate the carbons. The action of the starting magnet, however, in drawing the arc quickly raises the voltage impressed on the auxiliary field 25 and modifies the action of the armature 12.

After the carbons have been separated by the striking magnet, the voltage across the arc is maintained at a constant value by the action of armature 12 which rotates in one direction or the other, moving the carbons together or separating them automatically, according as the voltage across the arc is above or below the normal for which adjustments have been made.

If, during the operation of the lamp, the arc circuit be opened between the generator and the starting box magnet, the starting box solenoid will be deënergized, releasing the handle which swings to the left under the impulse of a spring, thus opening the motor circuit. Were it not for this or an equivalent connection it will be seen that the weakened field of motor 3 would cause the armature 12 to rotate in a direction to separate the carbons, until the supporting arms were jammed at the ends of the threaded portions of the shafts 34 and 35.

It is also found that a similar jamming can be occasioned by the inertia of the armature 12 after the motor circuit has been opened if the gear 39 is splined on the armature shaft. It will be seen that this difficulty is obviated by the electro-magnetic clutch 40 which is deënergized when the motor circuit is opened, allowing the armature shaft to turn freely in the gear 39 and stopping all motion of the gear train.

Having thus described my invention and its use, I claim:—

1. In a electric regulator, an arc circuit including lamp elements, means for effecting a gradual movement of said elements to or away from each other according as the current through them varies, a motor circuit independent of the arc circuit comprising two motors, the armature of one motor fixed to and rotary with one element of the other motor, the other element of the latter motor being freely rotary, some of the field magnet coils of the latter motor in circuit with said lamp and mechanism connected between said freely rotary element and said arc lamp for adjusting said lamp when the current through the same varies, and a starting box, the solenoid of which is energized from the arc circuit, whereby, when the arc circuit is opened, said solenoid is automatically deenergized, the motor circuit is opened and further movement of the regulating mechanism is arrested.

2. In an electric regulator, an arc circuit including lamp elements and means for effecting an abrupt measured separation of said elements, in combination with a motor circuit comprising two motors, the armature of one motor fixed to and rotary with one element of the other motor, the other element of the latter motor being freely rotary, some of the field motor coils of the latter motor being energized from the motor circuit and wound to oppose the coils in shunt to the arc, some of the field magnet coils of the latter motor being energized from the motor circuit, some of the field magnet coils of the latter motor in circuit with said lamp and mechanism connected between said freely rotary element and said lamp for adjusting said lamp elements when the current through the same varies, and an adjustable resistance located in the motor circuit and connecting with the field coils of one of the motors, whereby the apparatus can be so set that it will maintain any desired voltage across the arc.

3. In an electric regulator, an arc circuit including lamp elements, means for effecting a gradual movement of said elements to or away from each other according as the current through them varies, a motor circuit independent of the arc circuit, comprising two motors, the armature of one motor fixed to and rotary with one element of the other motor, the other element of the latter motor being freely rotary, some of the field magnet coils of the latter motor in circuit with said lamp, mechanism connected between said freely rotary element and said lamp for adjusting said lamp elements when the current through the same varies, and means operable by the opening of the arc circuit to open the motor circuit and arrest further movement of the adjusting mechanism.

In witness whereof, I have signed my name to this specification in presence of two subscribing witnesses this eighteenth day of February, 1910.

HENRY W. HOBBS.

In presence of—
 ELGIN C. VERRILL,
 MARY C. PAGE.